(12) United States Patent
Wu

(10) Patent No.: US 11,121,884 B2
(45) Date of Patent: Sep. 14, 2021

(54) ELECTRONIC SYSTEM CAPABLE OF SELF-CERTIFICATION

(71) Applicant: PUFsecurity Corporation, Hsinchu County (TW)

(72) Inventor: Chia-Cho Wu, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 49 days.

(21) Appl. No.: 16/801,168

(22) Filed: Feb. 26, 2020

(65) Prior Publication Data

US 2020/0389328 A1 Dec. 10, 2020

Related U.S. Application Data

(60) Provisional application No. 62/859,209, filed on Jun. 10, 2019.

(51) Int. Cl.
*G06F 7/04* (2006.01)
*H04L 9/32* (2006.01)
*H04L 9/08* (2006.01)
*G06F 9/30* (2018.01)
*H04L 9/06* (2006.01)
*G06F 15/16* (2006.01)

(52) U.S. Cl.
CPC ........ *H04L 9/3278* (2013.01); *G06F 9/30029* (2013.01); *H04L 9/0662* (2013.01); *H04L 9/0894* (2013.01)

(58) Field of Classification Search
CPC . G06F 9/30029; H04L 9/0662; H04L 9/0894; H04L 9/3278
See application file for complete search history.

(56) References Cited

U.S. PATENT DOCUMENTS

| | | | |
|---|---|---|---|
| 5,872,917 A | 2/1999 | Hellman | |
| 6,675,337 B1* | 1/2004 | Tung | G01R 31/318342 714/733 |
| 6,904,527 B1* | 6/2005 | Parlour | G06F 21/76 713/100 |

(Continued)

FOREIGN PATENT DOCUMENTS

| | | |
|---|---|---|
| CN | 108234132 A | 6/2018 |
| TW | 201346618 A | 11/2013 |
| TW | 201610745 A | 3/2016 |

*Primary Examiner* — Gary S Gracia
(74) *Attorney, Agent, or Firm* — Winston Hsu

(57) ABSTRACT

An electronic system includes a first circuit and a second circuit. The first circuit includes a first activation unit and a first functional unit. The first activation unit receives a first challenge string, generates a first response string according to the first challenge string and a first key, and outputs the first response string. The first functional unit performs first designated function. The second circuit includes a second activation unit and a second functional unit. The second activation unit sends the first challenge string to the first circuit during a first activation operation, and determines whether the first activation operation passes certification or not according to the first challenge string, the first response string and the first key. The second functional unit performs second designated function when the first activation operation is determined to have passed the certification.

20 Claims, 5 Drawing Sheets

(56) References Cited

U.S. PATENT DOCUMENTS

| | | | | |
|---|---|---|---|---|
| 7,685,418 | B1* | 3/2010 | Knight | H04L 9/3236 |
| | | | | 713/165 |
| 8,402,401 | B2* | 3/2013 | Chakraborty | G06F 30/327 |
| | | | | 716/102 |
| 9,734,496 | B2* | 8/2017 | Nahari | H04W 12/10 |
| 9,792,440 | B1* | 10/2017 | Wang | H04L 63/1466 |
| 2008/0196086 | A1* | 8/2008 | Shintani | G06F 21/10 |
| | | | | 726/4 |
| 2014/0211944 | A1* | 7/2014 | Hayward | H04L 9/0894 |
| | | | | 380/281 |
| 2015/0278527 | A1 | 10/2015 | Falk | |
| 2017/0085578 | A1* | 3/2017 | Ha | H04L 9/3234 |
| 2017/0180140 | A1 | 6/2017 | Mai | |
| 2018/0316512 | A1* | 11/2018 | Wittenauer | H04L 9/3271 |
| 2018/0345904 | A1* | 12/2018 | Moore | G07C 9/00174 |
| 2019/0327610 | A1* | 10/2019 | Rajadurai | H04W 4/02 |
| 2020/0110879 | A1* | 4/2020 | Linton | G06F 21/575 |

* cited by examiner

ELECTRONIC SYSTEM CAPABLE OF SELF-CERTIFICATION

CROSS REFERENCE TO RELATED APPLICATIONS

This non-provisional application claims priority of U.S. provisional application No. 62/859,209, filed on Jun. 10, 2019, included herein by reference in its entirety.

BACKGROUND OF THE INVENTION

1. Field of the Invention

The present invention is related to an electronic system, and more particularly, to an electronic system capable of self-certification.

2. Description of the Prior Art

As system-on-chip (SoC) becomes more and more complicate, it usually adopts intellectual properties (IPs) designed by different companies. For example, the SoC may include a processor designed by one company and include a flash memory designed by another company. In this case, since the companies designing the function circuits, such as the processor and the memory, are not responsible for the manufacture, these companies may only provide the hardware description files of the function circuits they designed.

In view of the very large-scale integration (VLSI), the intellectual properties can be called macros, and can be divided into two categories, soft macros and hard macros. The hard macros are targeted for specific IC manufacturing technology and are optimized for power, area or timing. Therefore, in physical design, the designer can only access pins of hard macros. For example, the memory block is usually provided as a hard macro.

However, the circuits for performing complicate computations, such as the processor or the controller, are usually provided as soft macros. The soft macros are more flexible than hard macros in terms of reconfigurability. For example, the soft macros can be synthesized by standard cells and are not specific to any manufacturing process. Therefore, the power, area, and timing of the soft macros are unpredictable.

However, the flexibility of the soft macro also brings risks because the source code of the soft macro may be adopted to other devices or systems without authorization. That is, the SoC designer may reuse the processor or the controller described in the source code in another system without paying the license fee to the original design companies.

SUMMARY OF THE INVENTION

One embodiment of the present invention discloses an electronic system. The electron system includes a first circuit and a second circuit.

The first circuit includes a first activation unit and a first functional unit. The first activation unit receives a first challenge string, generates a first response string according to the first challenge string and a first key, and outputs the first response string. The first functional unit performs the first designated function.

The second circuit includes a second activation unit and a second functional unit. The second activation unit sends the first challenge string to the first circuit during a first activation operation, and determines whether the first activation operation passes certification or not according to the first challenge string, the first response string and the first key. The second functional unit performs a second designated function when the first activation operation is determined to have passed the certification, and not performing the second designated function when the first activation operation is determined to have failed the certification.

Another embodiment of the present invention discloses a method for operating an electronic system. The electronic system includes a first circuit and a second circuit.

The method includes before the second circuit performs a designated function, performing a first activation operation, during the first activation operation, the second circuit sending a first challenge string to the first circuit, the first circuit generating a first response string according to the first challenge string and a first key, the first circuit outputting the first response string to the second circuit, and the second circuit determining whether the first activation operation passes certification or not according to the first challenge string, the first response string and the first key. When the first activation operation is determined to have passed certification, the second circuit performs the designated function, and when the first activation operation is determined to have failed the certification, the second circuit not performing the designated function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
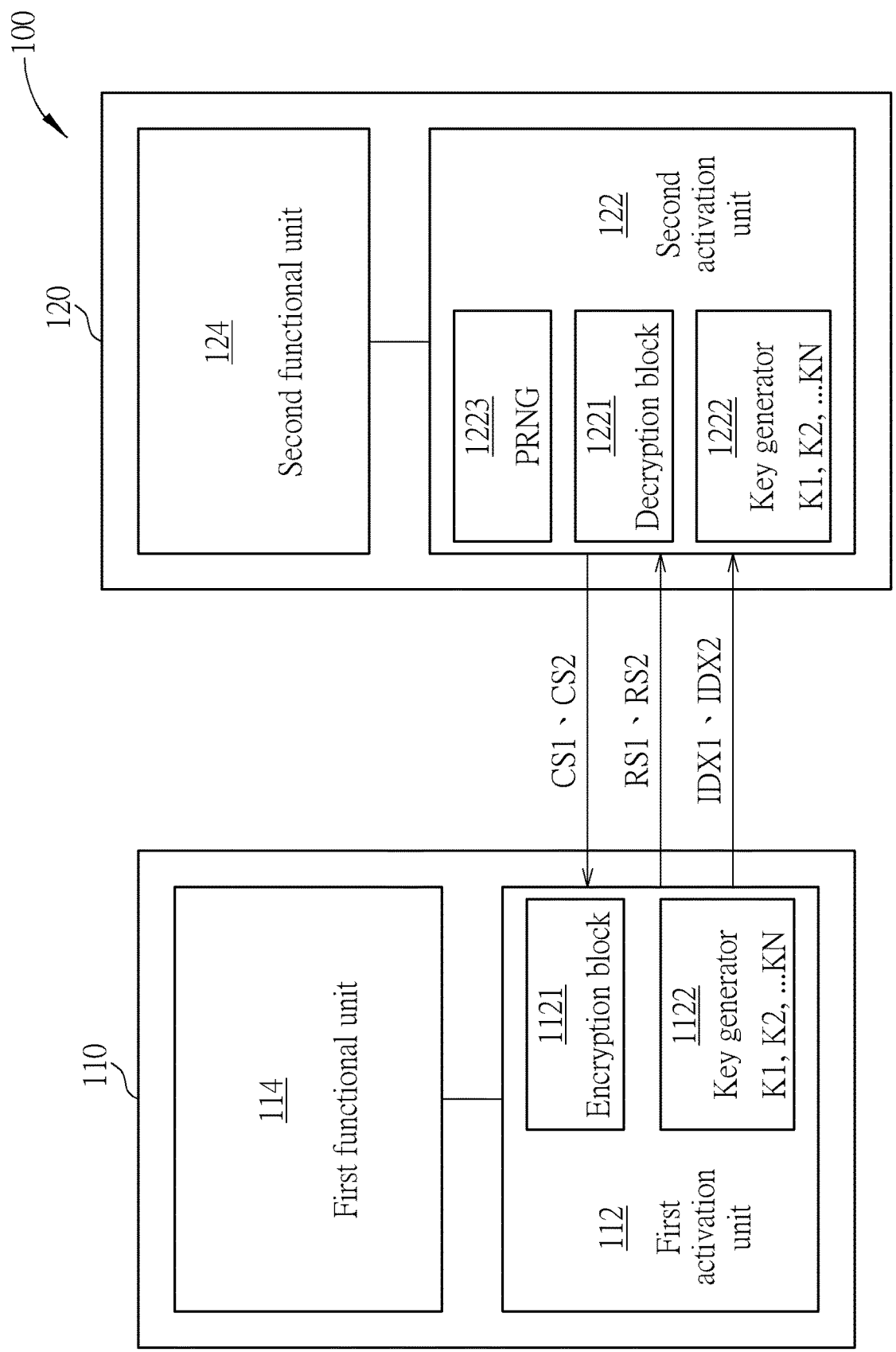
FIG. 1 shows an electronic system according to one embodiment of the present invention.

FIG. 1 shows an electronic system 100 according to one embodiment of the present invention. The electronic system 100 includes a first circuit 110 and a second circuit 120.

The first circuit 110 includes a first activation unit 112 and a first functional unit 114. The second circuit 120 includes a second activation unit 122 and a second functional unit 124. In some embodiments, each of the first circuit 110 and the second circuit 120 can perform designated functions, and the functional units 114 and 124 can perform the operations required by the designated functions. For example, the first circuit 110 can be a memory performing read operations and write operations while the second circuit 120 can be a controller for performing logic operations required by the electronic system 100.

In some embodiments, the logic operations performed by the second circuit 120 may be related to the data stored in the first circuit 110. For example, the first functional unit 114 may store a plurality of random bits, and the second functional unit 124 may retrieve at least one random bit from the first functional unit 114 for computations related to system authentication. For example, while the first functional unit 114 performs read operations and write operations, the second functional unit 124 can perform logic operations to achieve the calculations required by the elliptic-curve cryptography (ECC) or advance encryption standard (AES) with the random bits stored in the first functional unit 114.

In some embodiments, the electronic system 100 can be a system-on-chip, and the first circuit 110 can be provided as a hard macro while the second circuit 120 can be provided as a soft macro. In this case, to protect the second circuit 120 from being reused without authorization, the activation units 112 and 122 of the first circuit 110 and the second circuit 120 respectively can be used for certification.

For example, the first circuit 110 and the second circuit 120 can store the same key K1, and the first circuit 110 and the second circuit 120 can perform a first activation operation with the key K1 before the second functional unit 124 starts to perform the designated function. During the first activation operation, the second activation unit 122 can send a challenge string CS1 to the first circuit 110, the first activation unit 112 can receive the challenge string CS1 and generate a response string RS1 according to the challenge string CS1 and the key K1. Afterwards, the first activation unit 112 can output the response string RS1 to the second activation unit 122, and the second activation unit 122 would determine whether the first activation operation passes certification or not according to the challenge string CS1, the response string RS1 and the key K1.

In some embodiments, the second functional unit 124 can perform the designated function only when the first activation operation is determined to have passed the certification, and can refuse to perform the designated function when the first activation operation is determined to have failed the certification. That is, the second circuit 120 can only function when the first activation operation passes the certification with the first circuit 110. Consequently, although the second circuit 120 is provided as a soft macro, the second circuit 120 can be protected by the first circuit 110 which is provide as a hard macro, thereby preventing the second circuit 120 from being reused without authorization. Furthermore, since the second functional unit 124 and the second activation unit 122 of the second circuit 122 are synthesized together to form a netlist file, it would be difficult to distinguish these two units from the netlist file of the soft macro; therefore, the activation scheme can reside in the electronic system 100 safely.

In some embodiments, the first activation unit 112 can generate the response string RS1 by performing reversible logical computation to the challenge string CS1 and the key K1. For example, the exclusive OR (XOR) computation can be performed to the challenge string CS1 and the key K1 for generating the response string RS1. In this case, if the challenge string CS1 is "10010101" and the key K1 is "01101100", then the response string RS1 would be "11111001". In this case, the second activation unit 122 can determine whether the first activation operation passes certification or not by performing the exclusive OR computation to the challenge string CS1 and the response string RS1 to generate a computation result, and comparing the computation result with the key K1. Consequently, when the computation result is equal to the key K1, the second activation unit 122 would determine that the first activation operation has passed the certification. For example, in this case, if the computation result equals to the key K1, that is, "01101100", then the first activation operation would pass the certification. However, if the computation result is not equal to the key K1 or if the second activation unit 122 has not received the response string RS1 within a predetermined period, the second activation unit 122 can determine that the first activation operation has failed the certification.

In some embodiments, the first activation unit 112 can include an encryption block 1121 for generating the response string RS1, and the second activation unit 122 can include a decryption block 1221 for decrypting the response string RS1 and generate the computation result. Although the encryption block 1121 and the decryption block 1221 may perform the exclusive OR computation for the encryption and decryption as aforementioned, in some other embodiments, the encryption block 1121 and the decryption block 1221 may also adopt other types of reversible computations for the encryption and decryption according to the system requirement. For example, the encryption block 1121 may generate the response string RS1 by using the Hash-based message authentication code (HMAC) or the Cipher-based Message Authentication Code (CMAC), and the decryption block 1221 can decrypt the response string RS1 accordingly.

Also, in some embodiments, the first activation unit 112 can include a key generator 1122 for storing a plurality of keys K1 to KN, where N is an integer greater than 1, and the second activation unit 122 can include a key generator 1222 for storing the same keys K1 to KN. In this case, when the first activation operation begins, the key generator 1122 of the first activation unit 112 can send the key index to the second activation unit 122 to notify the second activation unit 122 of the key to be used. For example, if the key K1 will be used to generate the response string RS1, the key generator 1122 of the first activation unit 112 may send the key index IDX1 carrying the first index corresponding to the key K1 to the second activation unit 122, and the key generator 1222 of the second activation unit 122 would use the key K1 for the present certification accordingly. Therefore, the information of the keys K1 to KN will not be revealed directly outside of the first circuit 110 and the second circuit 120, thereby preventing the information of the keys K1 to KN from being recorded during the communications between the first circuit 110 and the second circuit 120.

Furthermore, in some embodiments, the activation operations can be performed while the designated function is performed by the second functional unit 124. For example, while the second functional unit 124 performs the designated function, a second activation operation can be performed to determine whether to continue the designated function or not.

In FIG. 1, during the second activation operation, the second activation unit 122 can send a challenge string CS2 to the first circuit 110, and the first activation unit 112 can generate a response string RS2 according to the challenge string CS2 and a key K2. In some embodiments, the first activation unit 112 can also send a key index IDX2 to the second activation unit 122 to notify the second activation unit 122 of the index of the key to be used. Afterwards, the second activation unit 122 would determine whether the second activation operation passes certification or not according to the challenge string CS2, the response string RS2 and the key K2.

In some embodiments, the first activation unit 112 can determine the keys to be used according to a random sequence so the keys used for certifications in different activation operations can be different and unpredictable, thereby enhancing the protection for the second circuit 120. Furthermore, in some embodiments, the challenge strings CS1 and CS2 used in different activation operations can also be different and unpredictable. For example, the challenge strings CS1 and CS2 can be numbers used once (NONCE), and the second activation unit 122 can include a pseudo-random number generator (PRNG) 1223 for generating the challenge strings CS1 and CS2.

Also, in some embodiments, the activation operations can be performed periodically while performing the designated function of the second functional unit 124 so the protection can be further enhanced. For example, the second activation operation can be performed after the first activation operation is performed for a predetermined period, and after the second activation operation is performed for the predetermined period, a third activation operation would be performed, and so on. By performing a plurality of activation operations while performing the designated function of the second functional unit 124, the difficulty for predicting the challenge strings and/or the keys used for certification during the activation operations would be further raised, thereby enhancing the protection for the electronic system 100.

Furthermore, in some other embodiments, instead of being performed periodically, the activation operations can be performed randomly while performing the designated function of the second functional unit 124, so the protection can be further enhanced. For example, the length of the interval between each two activation operations can be determined by a random number sequence, making the sequence of activation operations even more unpredictable.

Figure 2:
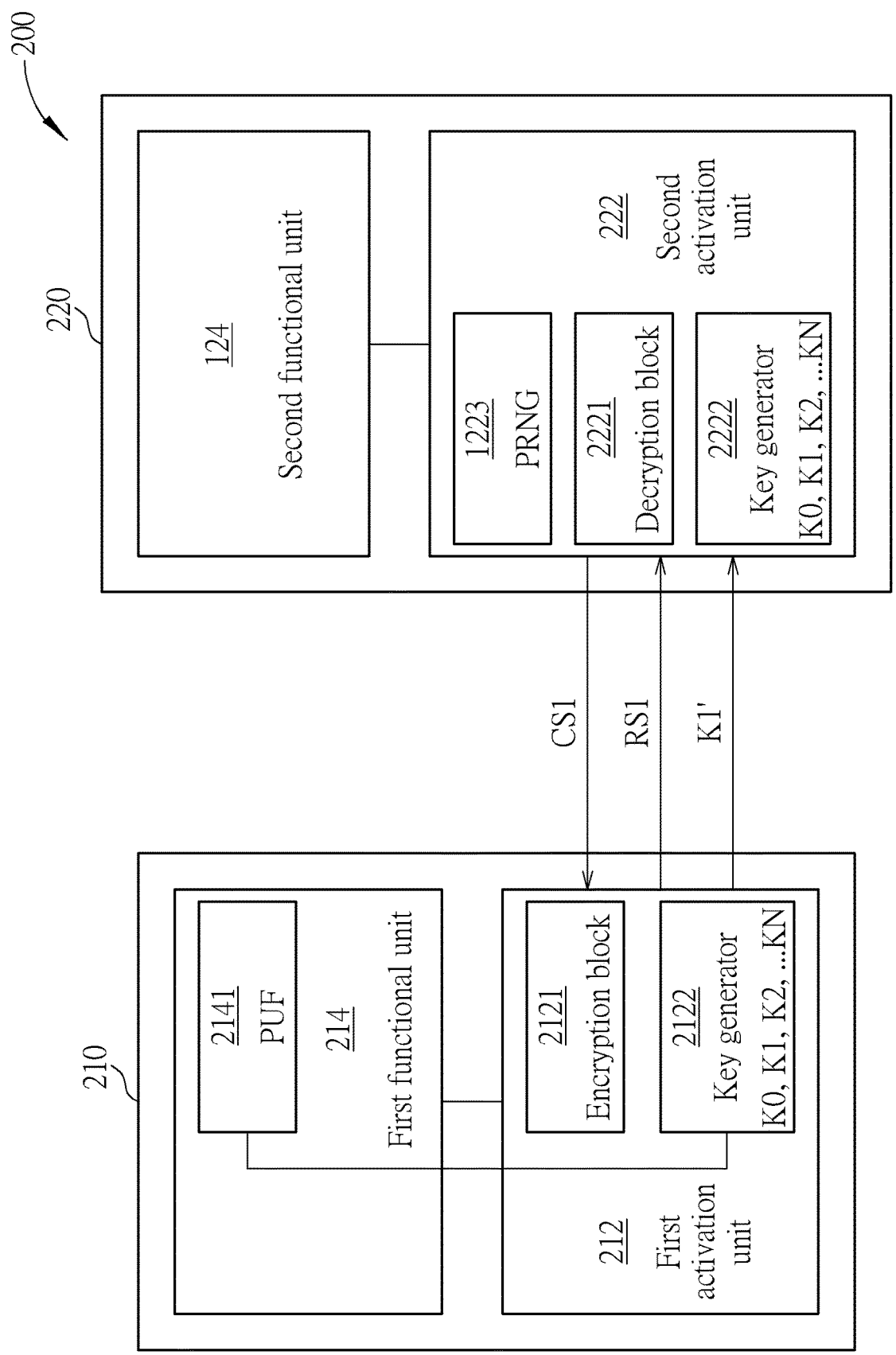
FIG. 2 shows an electronic system according to another embodiment of the present invention.

FIG. 2 shows an electronic system 200 according to one embodiment of the present invention. The electronic systems 100 and 200 have similar structures and can be operated with similar principles. However, in FIG. 2, the keys K1 to KN may be generated by the first circuit 210, and the first circuit 210 can wrap the keys K1 to KN before transmitting to the second circuit 220.

For example, the first functional unit 214 can include a PUF block 2141, and the PUF block 2141 can provide random bits for the key generator 2122 of the first activation unit 212 to generate the keys K1 to KN. Also, the key generators 2122 and 2222 can both store the same wrapping key K0. In this case, if the key K1 is chosen, the key generator 2122 can encrypt the key K1 with the wrapping key K0 to generate the wrapped key K1'. The wrapped key K1' can be transmitted to the second circuit 220, and the key generator 2222 of the second activation unit 222 will decrypt the wrapped key K1' with the wrapping key K0 to retrieve the key K1 to be used.

Consequently, the information of the keys K1 to KN will not be revealed directly outside of the first circuit 210 and the second circuit 220, thereby preventing the information of the keys K1 to KN from being recorded during the communications between the first circuit 210 and the second circuit 220. Also, the encryption block 2121 and the decryption block 2221 can still generate and the decrypt the response string RS1 with the key K1 for performing the activation operations. Furthermore, since the second activation unit 222 can derive the key to be used with the wrapping key K0, the second activation unit 222 does not need to store the keys K1 to KN, and the first activation unit 212 can generate keys K1 to KN on demand, making the verification process even more unpredictable.

In some embodiments, the wrapped key K1' can be generated by performing a reversible logic computation, for example but not limited to exclusive OR computation, to the key K1 and the wrapping key K0. However, in some other embodiments, other types of reversible computations may be adopted to wrap the key K1.

In FIG. 2, the keys K1 to KN can be generated with the random bits provided by the PUF block 2141; however, in some other embodiments, the keys K1 to KN can be store in the first activation unit 212 in advance or can be generated without the PUF block 2141.

Figure 3:
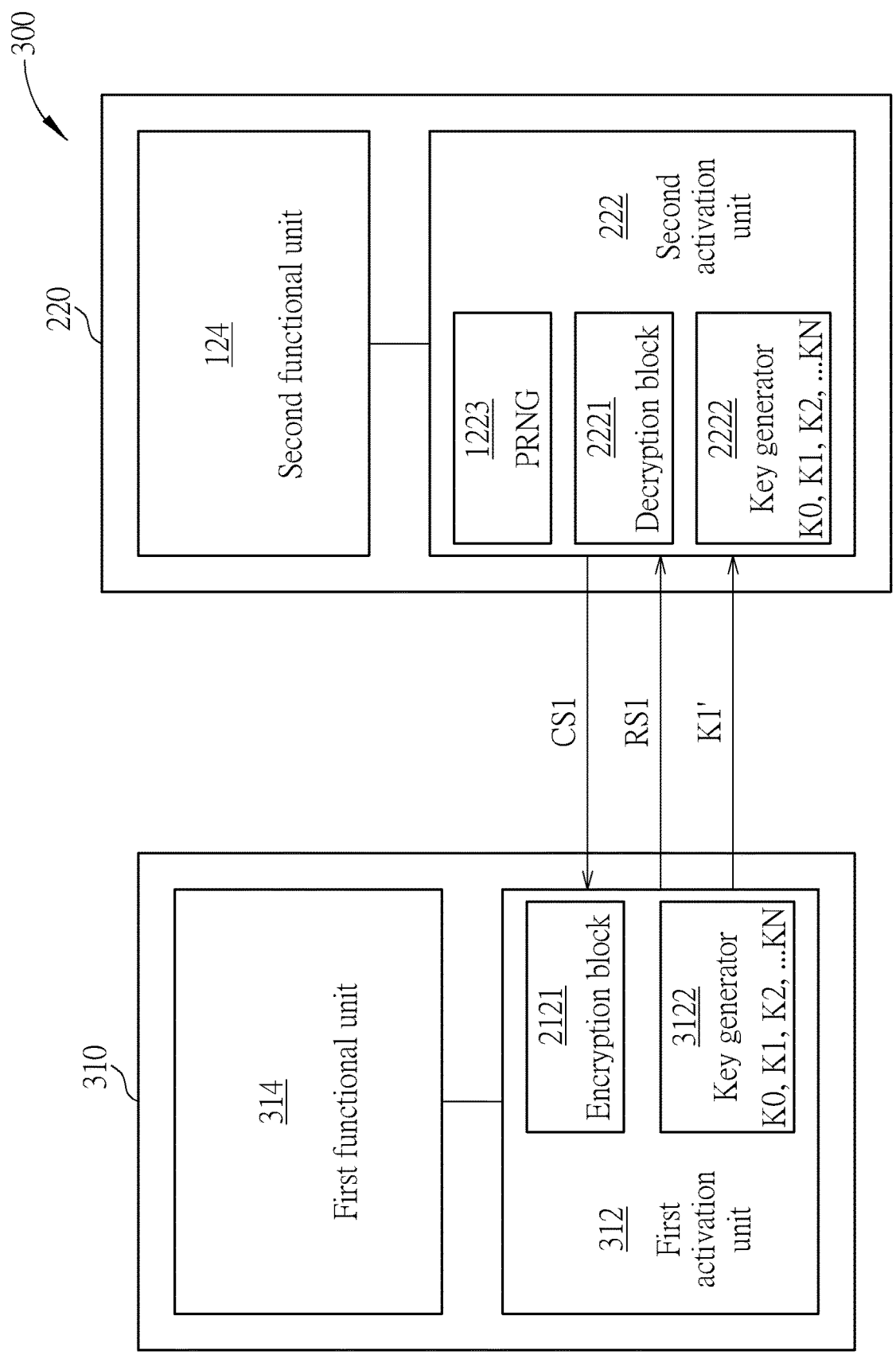
FIG. 3 shows an electronic system according to another embodiment of the present invention.

FIG. 3 shows an electronic system 300 according to one embodiment of the present invention. The electronic systems 300 and 200 have similar structures and can be operated with similar principles. However, in FIG. 3, the first functional unit 314 does not include the PUF block 2141, and the keys K1 to KN can be built in the first circuit 310. In this case, the key generator 3122 can store the keys K1 to KN and the wrapping key K0. Since the key generator 2222 can also store the same wrapping key K0. The verification between the first circuit 310 and the second circuit 220 can be performed with the similar principles as aforementioned for the electronic system 200.

Figure 4:
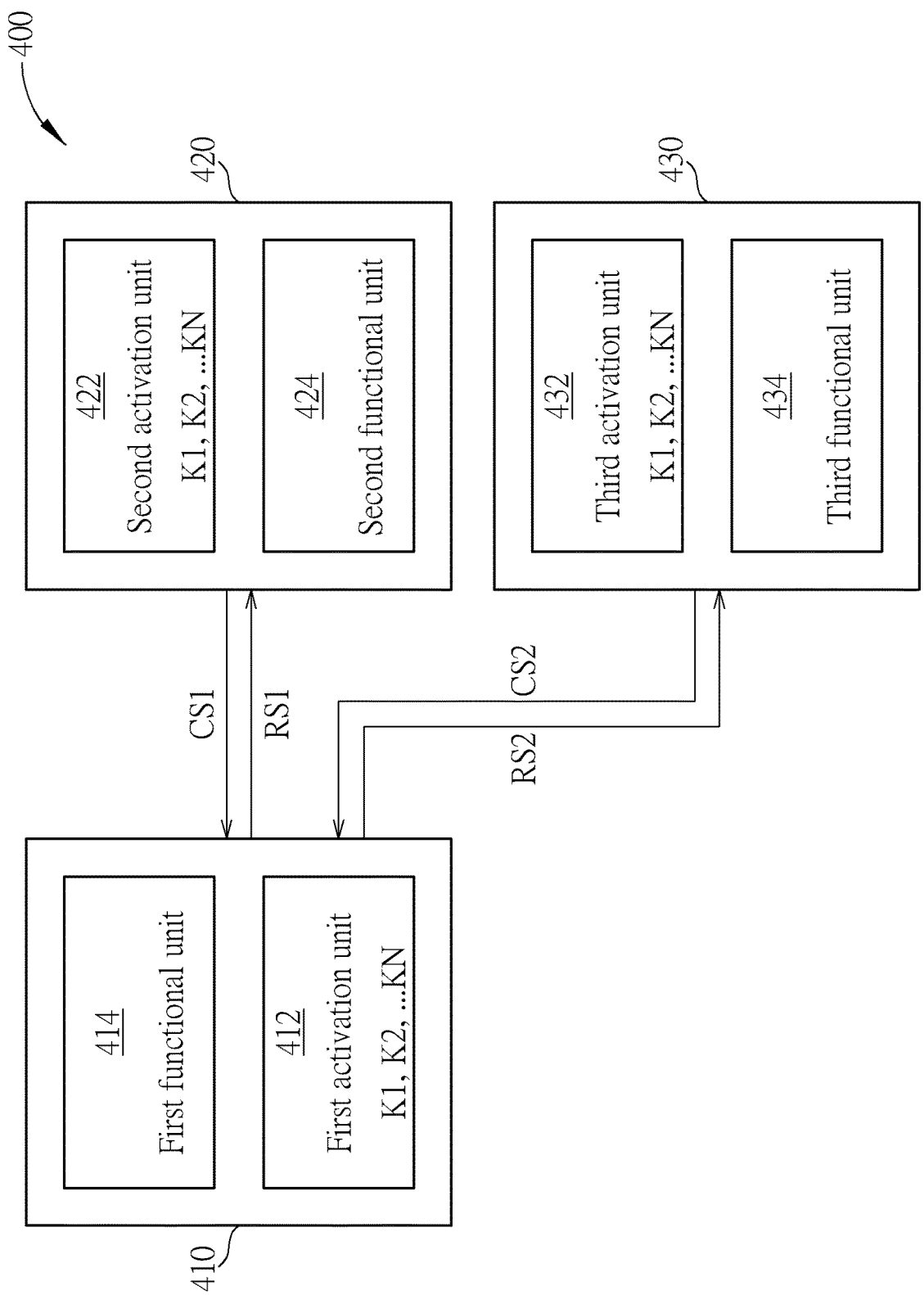
FIG. 4 shows an electronic system according to another embodiment of the present invention.

Furthermore, in some embodiments, the first circuits 110, 210, and 310 can be used to protect more than one soft macro. FIG. 4 shows an electronic system 400 according to one embodiment of the present invention. The electronic system 400 includes a first circuit 410, a second circuit 420, and a third circuit 430. The first circuit 410 includes a first activation unit 412 and a first functional unit 414. The second circuit 420 includes a second activation unit 422 and a second functional unit 424, and the third circuit 430 includes a third activation unit 432 and a third functional unit 434.

In some embodiments, the first circuit 410 can be provided as a hard macro, and the second circuit 420 and the third circuit 430 respectively can be provided as a soft macro. Also, the first circuit 410 can be used to perform the verifications with the second circuit 420 and the third circuit 430. For example, the first circuit 410, the second circuit 420, and the third circuit 430 can store the same keys K1 to KN. In this case, the second circuit 420 may perform an activation operation and send a challenge string CS1 before the second functional unit 424 can perform its designated function. The first circuit 410 can encrypt the challenge string CS1 with a key chosen from the keys K1 to KN to generate the response string RS1, and the response string RS1 can be sent to the second circuit 420. After the response string RS1 is received, the second circuit 420 can decrypt the response string RS1 with the chosen key and/or the challenge string CS1 to determine whether the activation operation passes certification or not.

Similarly, the third circuit 430 can perform an activation operation before the third functional unit 434 can perform its designated function. The third circuit 430 may send a challenge string CS2 to the first circuit 410, and the first circuit 410 can encrypt the challenge string CS2 with another key chosen from the keys K1 to KN to generate the response string RS2. The response string RS2 can be sent to the third circuit 430, and the third circuit 430 can decrypt the response string RS2 with the chosen key and/or the challenge string CS2 to determine whether the activation operation passes certification or not. That is, the first circuit 410 can be used to protect more than one soft macro according to the system requirement.

In some embodiments, the first circuit 410 can be implemented with the first circuit 110, and the second circuit 420 and the third circuit 430 respectively can be implemented with the second circuits 120. However, in some other embodiments, the first circuits 210 and 310 can be used to implement the first circuit 410, and correspondingly, the second circuit 220 can be used to implement the second circuit 420 and the third circuit 430.

Figure 5:
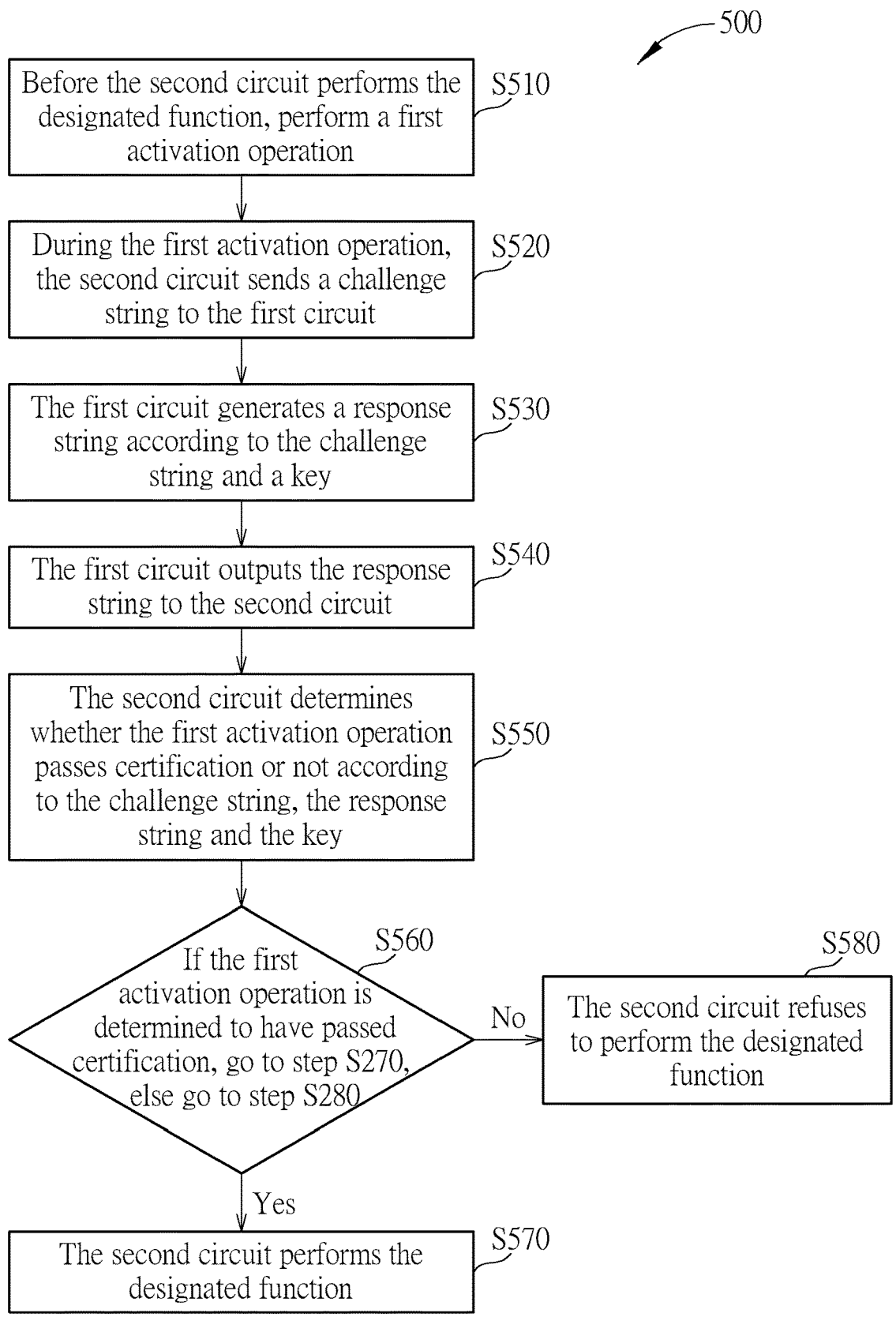
FIG. 5 shows a flowchart of a method for operating the electronic system in FIG. 1.

FIG. 5 shows a flowchart of a method 500 for operating the electronic system 100. The method 500 includes steps S510 to S580.

S510: before the second circuit 120 performs the designated function, perform a first activation operation;

S520: during the first activation operation, the second circuit 120 sends a challenge string CS1 to the first circuit 110;

S530: the first circuit 110 generates a response string RS1 according to the challenge string CS1 and a key K1;

S540: the first circuit outputs the response string RS1 to the second circuit 120;

S550: the second circuit 120 determines whether the first activation operation passes certification or not according to the challenge string CS1, the response string RS1 and the key K1;

S560: if the first activation operation is determined to have passed certification, go to step S570, else go to step S580;

S570: the second circuit 120 performs the designated function;

S580: the second circuit 120 refuses to perform the designated function.

In some embodiments, steps S530 and S550 can be performed with exclusive OR computations. For example, in step S530, the first circuit 110 can perform the exclusive OR (XOR) computation to the challenge string CS1 and the key K1 to generate the response string RS1. Also, in step S550, the second circuit 120 can perform the exclusive OR computation to the challenge string CS1 and the response string RS1 to generate a computation result, and the second circuit 120 can compare the computation result with the key K1 to determine if the first activation operation have passed the certification or not. In some embodiments, if the second circuit 120 fails to receive the response string RS1 for a predetermined period of time, the second circuit 120 will also determine that the first activation operation has failed the certification. Also, in some embodiments, instead of performing the exclusive OR computation, other types of reversible logic computation, such as the Hash-based message authentication code and the Cipher-based Message Authentication Code (CMAC), may be adopted according to the system requirement.

Consequently, the second circuit 120 which is provided as a soft macro can be protected by the first circuit 110 which is provide as a hard macro.

In some embodiments, the activation operations can also be performed periodically or randomly during the performing process of the designated function of the second circuit 120, thereby further enhancing the protection for the second circuit 120.

In summary, the electronic system and the method for operating the electronic system provided by the embodiments of the present invention can protect the circuits with the self-certification scheme by performing activation operations before the circuits start to perform the designated functions. Therefore, the circuit provided as a soft macro can be protected by the circuit provided as a hard macro, thereby reducing the risk of the soft macro being reused without authorization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system comprising:
a first circuit comprising:
a first activation unit configured to receive a first challenge string, generate a first response string using an encryption block according to the first challenge string and a first key, and output the first response string; and
a first functional unit configured to perform a first designated function after a first activation operation passes certification; and
a second circuit comprising:
a second activation unit configured to send the first challenge string to the first circuit during the first activation operation, and determine whether the first activation operation passes certification or not according to the first challenge string, the first response string and the first key; and
a second functional unit configured to perform a second designated function when the first activation operation is determined to have passed the certification, and not perform the second designated function when the first activation operation is determined to have failed the certification;
wherein before the first function unit performs the first designated function and the second function unit performs the second designated function, perform the first activation operation using the first activation unit and determine whether the first activation operation passes certification or not using the second activation unit; and
wherein the first functional unit performs read/write operations while the second functional unit performs logic operations required by the electronic system and the electronic system is a system-on-chip.

2. The electronic system of claim 1, wherein:
the first circuit is provided as a hard macro; and
the second circuit is provided as a soft macro.

3. The electronic system of claim 1, wherein:
the first functional unit is a memory configured to perform read operations and write operations; and
the second functional unit is a controller configured to perform computations required by the electronic system.

4. The electronic system of claim 1, wherein:
while the second functional unit performs the second designated function, a second activation operation is performed to determine whether to continue the second designated function or not; and
during the second activation operation, the second activation unit sends a second challenge string to the first circuit, the first activation unit generates a second response string according to the second challenge string and a second key, and the second activation unit determines whether the second activation operation passes certification or not according to the second challenge string, the second response string and the second key.

5. The electronic system of claim 4, wherein:
the first key is different from the second key.

6. The electronic system of claim 4, wherein:
the first challenge string is different from the second challenge string.

7. The electronic system of claim 4, wherein:
the second activation unit comprises a pseudorandom number generator (PRNG) configured to generate the first challenge string and the second challenge string.

8. The electronic system of claim 4, wherein:
the second activation operation is performed after the first activation operation is performed for a predetermined fixed period or a randomly determined period.

9. The electronic system of claim 4, wherein:
after the second activation operation is performed for a predetermined period, a third activation operation is performed to determine whether to continue the second designated function or not.

10. The electronic system of claim 1, wherein:
the first activation unit generates the first response string by performing an exclusive OR (XOR) computation to the first challenge string and the first key.

11. The electronic system of claim 10, wherein:
the second activation unit determines whether the first activation operation passes certification or not by performing an exclusive OR computation to the first challenge string and the first response string to generate a computation result, and comparing the computation result with the first key.

12. The electronic system of claim 11, wherein:
when the computation result is not equal to the first key or when the second activation unit has not received the first response string within a predetermined period, the second activation unit determines that the first activation operation has failed the certification; and
when the computation result is equal to the first key, the second activation unit determines that the first activation operation has passed the certification.

13. The electronic system of claim 1, wherein:
the first activation unit is further configured to store a plurality of keys;
the second activation unit is further configured to store the plurality of keys; and
the first activation unit is further configured to send a key index to the second activation unit to notify the second activation unit of the first key to be used in the plurality of keys.

14. The electronic system of claim 1, wherein:
the first functional unit comprises a physical unclonable function (PUF) block configured to provide the first activation unit a plurality of random bits for generating a plurality of keys.

15. A method for operating an electronic system, the electronic system comprising a first circuit and a second circuit, and the method comprising:
before the second circuit performs a second designated function, performing a first activation operation;
during the first activation operation, the second circuit sending a first challenge string to the first circuit;
the first circuit generating a first response string using an encryption block according to the first challenge string and a first key;
the first circuit outputting the first response string to the second circuit; the second circuit determining whether the first activation operation passes certification or not according to the first challenge string, the first response string and the first key;
when the first activation operation is determined to have passed certification, the first circuit performing a first designated function and the second circuit performing the second designated function; and
when the first activation operation is determined to have failed the certification, the second circuit not performing the second designated function; wherein the first circuit performs read/write operations while the second circuit performs logic operations required by the electronic system and the electronic system is a system-on-chip.

16. The method of claim 15, wherein:
the first circuit is provided as a hard macro; and
the second circuit is provided as a soft macro.

17. The method of claim 15, further comprising:
while the second circuit performs the second designated function, performing a second activation operation to determine whether to continue to perform the second designated function or not;
during the second activation operation, the second circuit sending a second challenge string to the first circuit;
the first circuit generating a second response string according to the second challenge string and a second key;
the first circuit outputting the second response string to the second circuit; and the second circuit determining whether the second activation operation passes certification or not according to the second challenge string, the second response string and the second key.

18. The method of claim 17, wherein:
the second activation operation is performed after the first activation operation is performed for a predetermined fixed period or a randomly determined period.

19. The method of claim 17, further comprising:
after the second activation operation is performed for a predetermined period, performing a third activation operation to determine whether to continue to perform the second designated function or not.

20. The method of claim 15, wherein:
the first circuit generating the first response string according to the first challenge string and the first key comprises the first circuit performing an exclusive OR (XOR) computation to the first challenge string and the first key to generate the first response string; and
the second circuit determining whether the first activation operation passes the certification or not according to the first challenge string, the first response string and the first key comprises:
the second circuit performing an exclusive OR computation to the first challenge string and the first response string to generate a computation result; and
the second circuit comparing the computation result with the first key.

* * * * *